C. J. CUTLER.
STORAGE LOCKER FOR MOTOR VEHICLES.
APPLICATION FILED JUNE 3, 1916. RENEWED MAY 31, 1917.
1,232,232. Patented July 3, 1917.
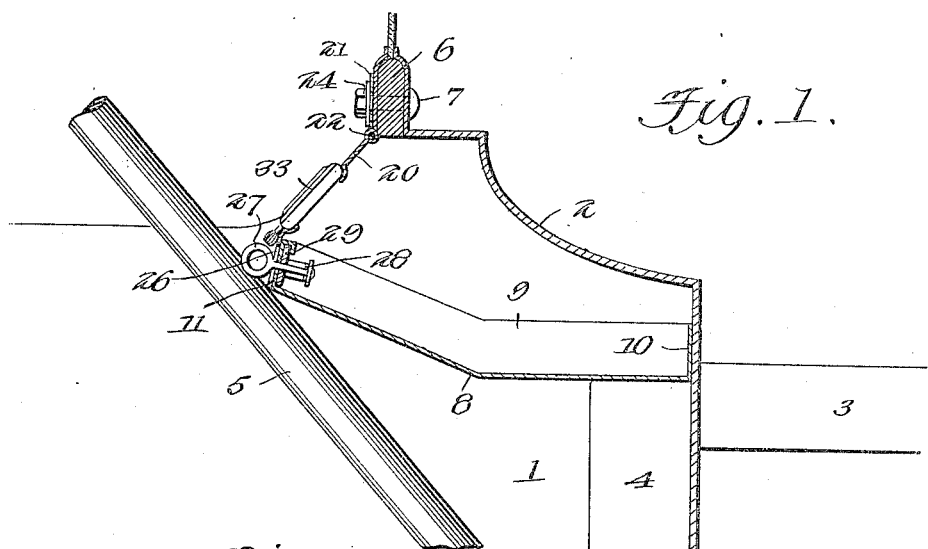
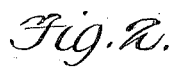
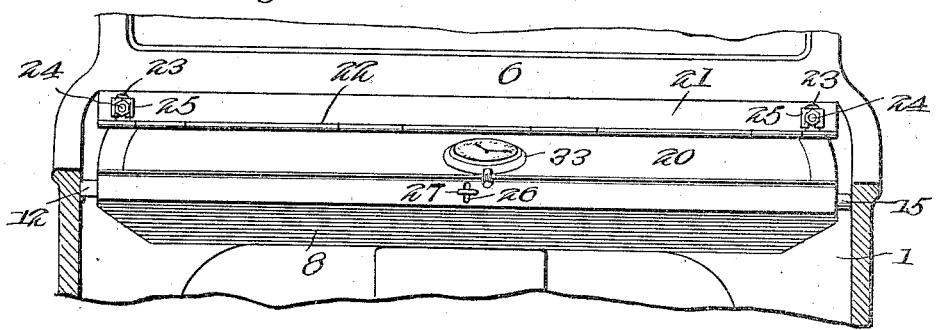
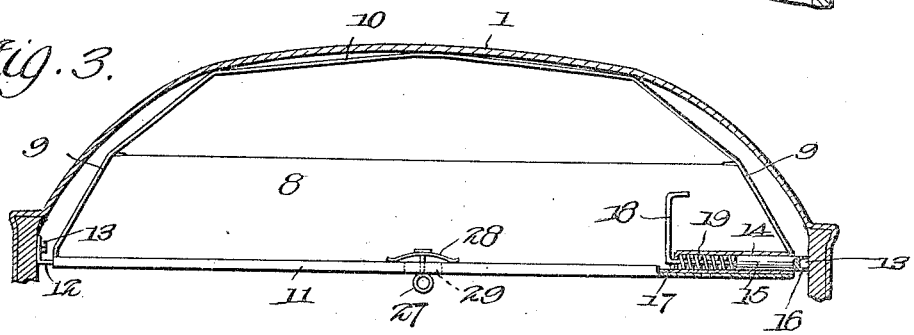
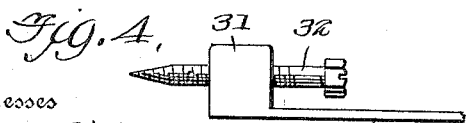
Witnesses
Inventor
Charles J. Cutler
By Victor J. Evans
Attorney

UNITED STATES PATENT OFFICE.

CHARLES JAMES CUTLER, OF BUTTE, MONTANA.

STORAGE-LOCKER FOR MOTOR-VEHICLES.

1,232,232.

Specification of Letters Patent.

Patented July 3, 1917.

Application filed June 3, 1916, Serial No. 101,570. Renewed May 31, 1917. Serial No. 172,102.

*To all whom it may concern:*

Be it known that I, CHARLES J. CUTLER, a citizen of the United States, residing at Butte, in the county of Silverbow and State of Montana, have invented new and useful Improvements in Storage-Lockers for Motor-Vehicles, of which the following is a specification.

This invention relates to storage lockers for motor vehicles, the object in view being to provide a tool box or locker for various articles which will fit into and occupy a space in certain types of automobiles, which space has not heretofore been utilized for any purpose.

A further object of the invention is to provide a device of the character referred to which is immediately accessible to the driver while in his seat, not requiring him to dismount from the machine.

Another object of the invention is to provide a device of the character referred to which may be readily fastened in place by means already found on the machine itself and without making any alteration whatever in the vehicle.

With the above and other objects in view, the invention consists in the novel construction, combination and arrangement of parts, as herein described, illustrated and claimed.

In the accompanying drawings:—

Figure 1 is a vertical longitudinal section through a sufficient portion of a motor vehicle to illustrate the present invention in its applied relation thereto.

Fig. 2 is a cross section through the vehicle in advance of the driver's seat, showing the device in elevation.

Fig. 3 is a plan view partly in section of the locker, showing the cowl dash and portions of the vehicle body in horizontal section.

Fig. 4 is a fragmentary view showing modified means for supporting the locker or box.

Referring to the drawings 1 designates the body of a vehicle, 2 the cowl dash, 3 the engine hood, 4 the coil box, 5 the steering column and 6 the windshield frame which surmounts the cowl dash 2 and is fastened thereto by means of windshield retaining bolts 7.

In carrying out the present invention, I form, preferably of sheet metal, a storage locker or tool box comprising a bottom wall 8, side walls 9, a front end wall 10 and a rear end wall 11. This box-like receptacle is adapted to be slid under the cowl dash 2 in the manner illustrated in Fig. 1 so as to occupy space hitherto unused. As shown, the device is preferably made of such size and shape as to find support on the coil box 4 and also upon the steering column 5.

The means for fastening the locker or box in place is best illustrated in Fig. 3 wherein it will be observed that at one side of the box, the latter is provided with an eye piece 12 formed with an eye to fit over the adjacent nut 13 of one of the windshield bolts. At the opposite side, the box has mounted therein a tubular guide 14 in which is a slidable tubular bolt 15 having a socket 16 in the end thereof designed to fit over another nut 13 corresponding with the nut 13 above described but arranged at the opposite side of the vehicle and fitted upon one of the windshield bolts. Extending inwardly from the bolt 15 is an operating stem 17 having a handle 18 thereon, the stem 17 being surrounded by means of a coiled spring 19 which is located in the tubular guide 17 and which acts to force the bolt 15 outwardly and hold the same in engagement with the adjacent nut 13. It will be observed at this point that by withdrawing the tubular bolt 15, it may be readily disengaged from the nut 13 at that side of the car and at the same time the eye piece 12 may be moved out of engagement with the adjacent nut 13 at that side of the machine due to the necessary amplitude of movement which is provided for the bolt 15. In the same manner, the storage locker or box may be placed in position and supported by the means described.

The cover or lid 20 of the box is formed with a normally vertical attaching plate or hanger strip 21, the lid 20 and the member 21 being connected by a rod hinge 22. The member 21 is formed at suitable places adjacent to the opposite extremities thereof with slots 23 of sufficient size to fit over the nuts 24 which are threaded on the windshield bolts 7, it being understood that the nuts 24 are on all machines of the type referred to. In order to secure the member 21 to the bottom portion of the windshield, the nuts 24 are slightly loosened and washers 25 having open slots therein are inserted over the bolts 7 and behind the nuts 24, after which the latter are tightened. This fastens the lid as a whole to the bottom bar of the windshield.

About centrally of its free edge, the lid 20 is provided with a slot 26 to receive an eye catch 27 which is fastened to the rear end wall 11 of the box, said eye catch being swiveled in an anti-rattling spring 28 as shown in Fig. 3, the wall 17 being formed with a longitudinally extending slot 29 to admit of a limited movement of the eye catch 27 in order that it may be shifted to register with the slot 26 in the lid. After the lid is closed and the eye catch 27 projects through the slot 26, the catch 27 is given a quarter turn as shown in Fig. 2 to prevent the lid 20 from flying open. The catch 27 is also adapted to receive a pad lock thus preventing unauthorized persons from removing any part of the contents of the storage locker or box.

In certain other makes of cars where the nuts 13 are not present, the box supporting means illustrated in Fig. 4 may be employed. In said figure 30 designates a box supporting bar having at the opposite ends thereof lugs 31 which are bored and internally threaded to receive fastening screws 32. The bar 30 including the lugs 31 is of slightly less length than the distance between the sides of the body so that it may be inserted between the sides of the body, after which the screws 32 are driven into the vehicle body sides. The bottom of the box is then allowed to rest upon the supporting bar 30 to which it may be fastened if desired. An automobile clock 33 may be mounted in the lid 20 and secured fixedly in relation thereto in any desired manner.

I claim:

1. The combination with a motor vehicle embodying a cowl dash, of a storage locker of box-like formation adapted to fit under said cowl dash, supporting means for said storage locker adapted to engage projections on the inside of the vehicle body, and a lid embodying an attaching portion to which the lid proper is hinged, said attaching portion being formed with openings to fit over the windshield bolts, and to be secured in place by the nuts of said bolts.

2. The combination with a motor vehicle embodying a cowl dash, of a storage locker of box-like formation adapted to fit under said cowl dash, supporting means for said storage locker adapted to engage projections on the inside of the vehicle body, and a lid embodying an attaching portion to which the lid proper is hinged, said attaching portion being formed with openings to fit over the windshield bolts, and to be secured in place by the nuts of said bolts, said supporting means embodying a spring pressed slidable bolt carried by the storage locker and adapted to be moved into and out of engagement with one of said projections.

In testimony whereof I affix my signature.

CHARLES JAMES CUTLER.

Copies of this patent may be obtained for five cents each, by addressing the "Commissioner of Patents, Washington, D. C."